United States Patent [19]

Yamada et al.

[11] Patent Number: 4,757,196
[45] Date of Patent: Jul. 12, 1988

[54] OPTICAL ENCODER AND METHOD FOR PRODUCING SAME

[75] Inventors: Koichi Yamada; Takahiro Kubo, both of Hyogo, Japan

[73] Assignee: Mitsubishi Denki Kabushiki Kaisha, Tokyo, Japan

[21] Appl. No.: 654,133

[22] Filed: Sep. 25, 1984

[30] Foreign Application Priority Data

Sep. 27, 1983 [JP] Japan ................. 58-178481

[51] Int. Cl.$^4$ ............................................. G01D 5/26
[52] U.S. Cl. ........................... 250/231 SE; 340/347 P; 250/237 G
[58] Field of Search .................. 250/231 SE, 237 G; 340/347 P, 870.29; 356/395

[56] References Cited

U.S. PATENT DOCUMENTS

| | | | |
|---|---|---|---|
| 2,938,378 | 5/1960 | Canada et al. | 356/395 |
| 3,985,448 | 10/1976 | Wiklund et al. | 250/237 G |
| 3,995,156 | 11/1976 | Angersbach et al. | 250/231 SE |
| 4,371,264 | 2/1983 | Lacombat et al. | 250/237 G |
| 4,377,028 | 3/1983 | Imahashi | 250/237 G |
| 4,528,448 | 7/1985 | Doggett | 250/231 SE |

OTHER PUBLICATIONS

Data Recording on optical discs at 300 Mb/s by G. J. Ammon and C. W. Reno, RCA Engineer 27-3, pp. 36–43, 1982.

*Primary Examiner*—David C. Nelms
*Assistant Examiner*—Charles F. Wieland
*Attorney, Agent, or Firm*—Staas & Halsey

[57] ABSTRACT

An optical encoder and a method for producing the same in which each slit on a pulse scale of the encoder, which is an encoder wheel in the case of a rotary type encoder, is formed as a plurality of parallel grooves. The grooves are formed by depositing a thin layer of a reflective and chemically stable metal such as chromium or aluminum on a transparent plate and scanning the metal film with a laser while moving the plate and on/off modulating the laser to evaporate portions of the film. The laser is moved for each line of grooves, radially in the case of an encoder wheel.

13 Claims, 4 Drawing Sheets

→ TIME

OPTICAL ENCODER AND METHOD FOR PRODUCING SAME

BACKGROUND OF THE INVENTION

The present invention relates to an optical encoder for detecting an amount of rotation or an amount of linear movement.

A conventional optical encoder of the same general type to which the invention pertains is shown in FIG. 1 of the accompanying drawings. FIG. 1 is a perspective view showing schematically the arrangement of a conventional optical encoder intended for the detection of the amount of rotation of a shaft 5. In FIG. 1, reference numeral 1 designates a light source such as a light-emitting diode, incandescent lamp, or the like; 2, a lens for converting the light output from the light source 1 into a parallel beam; 3, an encoder wheel; 4, slits formed in the encoder wheel 3 at an equal pitch in the circumferential direction; 5, the above-mentioned rotary shaft which may, for instance, be the output shaft of an electric motor or the like; 6, an index scale formed with slits having dimensions and spacings the same as the slits 4; and 7, a light detector disposed on the opposite side of the encoder wheel 4 from the light source 1.

FIG. 2A is an enlarged plan view of a portion of the encoder wheel 3 of FIG. 1, showing the slits 4 in detail, and FIG. 2B is a cross-sectional view taken along a line A—A in FIG. 2A. As FIGS. 2A and 2B show, the encoder wheel 3 is formed from a glass disk 8, with the slits 4 being formed by etching away portions of a chromium vaporized film which was originally deposited over the entire surface of the glass disk 8.

The operation of the optical encoder shown above will now be described. Light emitted by the light source 1 is converted into a parallel beam by the lens 2 prior to impinging upon the encoder wheel 3. The light transmitted through the slits 4 of the encoder wheel 3 strikes the index scale 6. The intensity of the light passing through the index scale 6 is a maximum when the slits 4 of the encoder wheel 3 are in alignment with the slits of the index scale 6 and is a minimum when the two sets of slits are interleaved. As a result, as the shaft 5 rotates, the output of the detector 7 is sinusoidal, as shown in FIG. 3A. This sinusoidal signal may be converted into a squarewave signal, as shown in FIG. 3B, and then into a pulse signal, as shown in FIG. 3C, using well-known circuits. Then, the amount of rotation of the shaft 5 can be detected by counting the number of the pulses.

Although the arrangement described above is adequate for detecting the amount of rotation of the shaft 5, it is often desired to be able to distinguish the direction of rotation as well. For this purpose, it has often been the practice to provide the index scale with two sets of slits offset in phase with respect to one another and two detectors so that two output signals are generated having a 90 degree phase difference. It is also possible to use three sets of slits and three detectors so that three phase signals (two main signals and a zero signal) are generated. In these cases, it is possible to distinguish the direction of rotation by detecting the phase relationship between two main signals, and also to detect the reference point from the zero signal.

Further, the resolution of the device can theoretically be improved by a factor of four by generating pulses on both the leading and trailing edges of the squarewave signal or signals. However, as a practical matter, the resolution of the device is often limited by the dimensional accuracies of the various components, including the dimensional accuracies of the slits 4 and the eccentricity of the encoder wheel 3 from the rotational center. Specifically, as the number of slits is made larger, the absolute dimensional accuracy of the slits 4 becomes more severe. For instance, for 10,000 pulses, the slits should have an accuracy of 3 seconds in order for the accuracy of detection to be within 5%. Using the encoder wheel construction as depicted in FIGS. 2A and 2B, it is thus necessary to use an expensive mask produced using electron beam etching techniques to form the slits with this accuracy.

Accordingly, the conventional optical encoder is disadvantageous in that it is time consuming to produce and expensive.

SUMMARY OF THE INVENTION

It is thus an object of the present invention to provide an optical encoder and a method for producing an optical encoder in which the disadvantages of the conventional optical encoder are eliminated.

In accordance with these and other objects of the invention, the invention provides an optical encoder and a method for producing an optical encoder in which each slit on a pulse scale, which may be a optical encoder wheel or linear plate, is formed as a plurality of parallel grooves by evaporating with a laser beam a metal film deposited on the surface of the pulse scale.

DESCRIPTION OF THE PREFERRED EMBODIMENTS

Figure 4A:
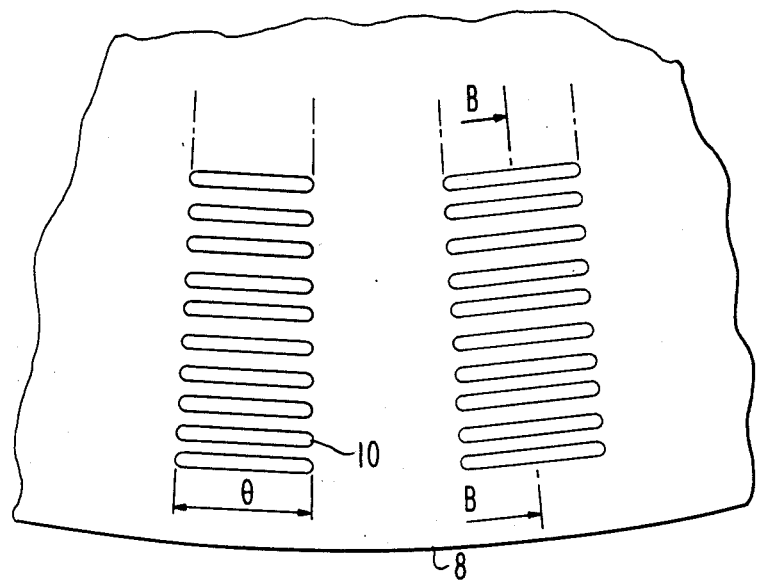
FIG. 4A is an enlarged plan view showing a portion of an encoder wheel of the invention.
Figure 4B:
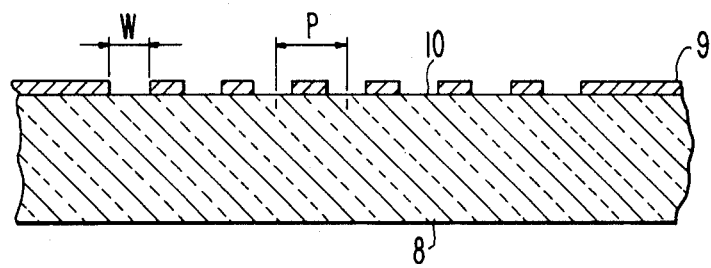
FIG. 4B is a cross-sectional view taken along a line B—B in FIG. 4A.

Referring first to FIGS. 4A and 4B of the drawings, a preferred embodiment of an optical encoder constructed in accordance with the present invention will be discussed. FIG. 4A is an enlarged view of a portion of an optical encoder wheel of the invention, and FIG.

4B is a cross-sectional view taken along a line B—B in FIG. 4A.

Figure 1:
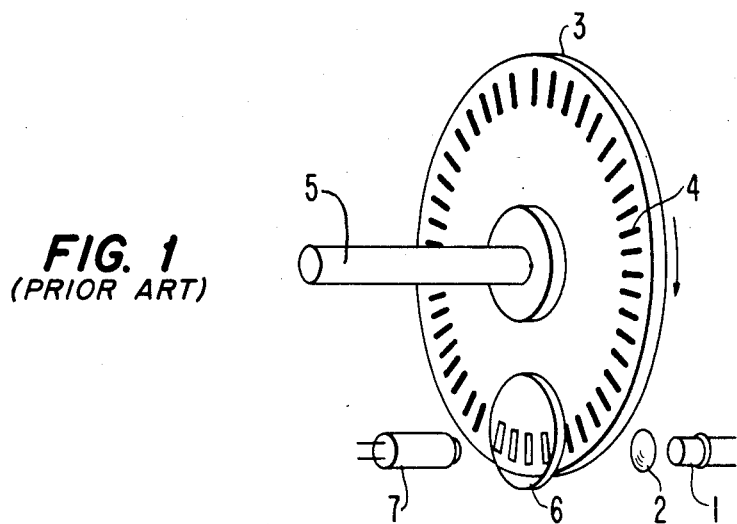
FIG. 1 is a perspective view showing a conventional optical encoder.
Figure 2A:
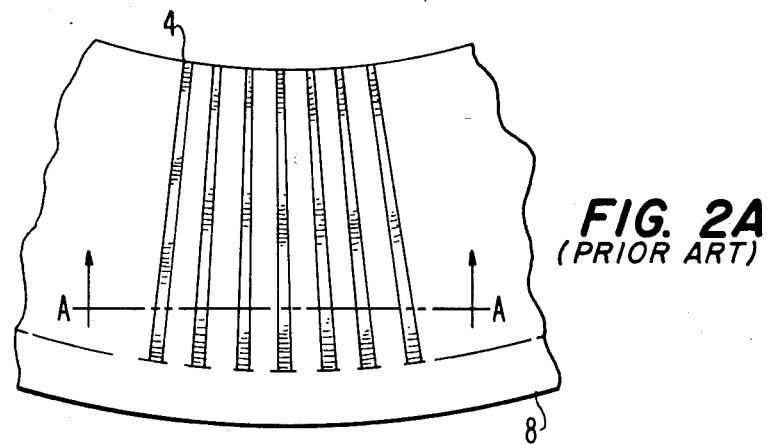
FIG. 2A is an enlarged plan view of a portion of an encoder wheel used in the optical encoder of FIG. 1.
Figure 2B:
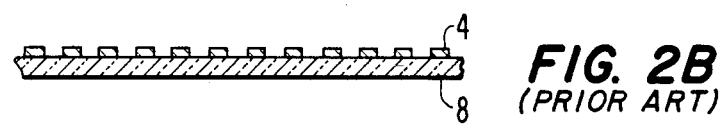
FIG. 2B is a cross-sectional view taken along a line A—A in FIG. 2A.
Figure 3A:
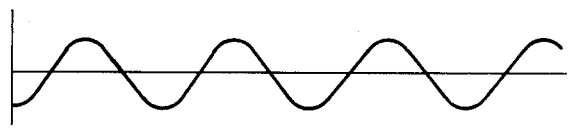
FIGS. 3A through 3C are waveform diagrams used to explain the operation of the optical encoder of FIG. 1.
Figure 3B:
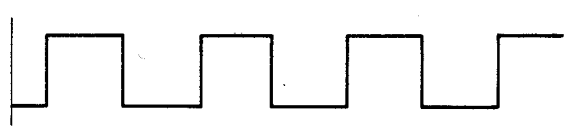
Figure 3C:
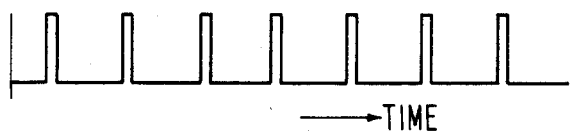

In FIGS. 4A and 4B, reference numeral 8 designates a glass disk used as a substrate; 9, a reflecting film made of metal; and 10, elongated grooves formed in the film 9 which transmit light therethrough. The grooves 10 are arcs of equal subtended angles of concentric circles. Accordingly, the grooves of each group of grooves become shorter toward the center of the disk 8. Each group of the grooves 10 corresponds to one slit 4 on the encoder wheel of FIG. 1. It is preferable for the pitch P of the grooves to be about 1.6 to 2.0 microns, and the width W of each groove 10 to be about 0.2 P to 0.8 P. For the metal of the film, metals such and chromium, aluminum and the like which provide a high reflectance and which are chemically stable are preferred.

Figure 5A:
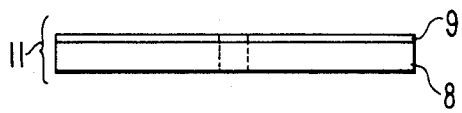
FIGS. 5A through 5C are a set of explanatory diagrams showing steps in the production of an encoder wheel of the invention.
Figure 5B:
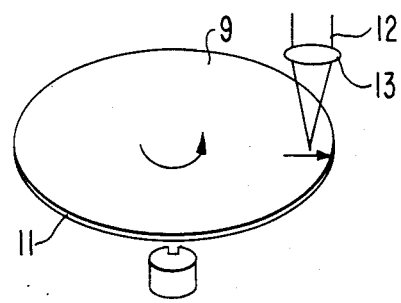
Figure 5C:
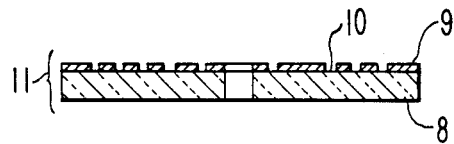

Referring now to FIGS. 5A through 5C, the steps of producing the optical encoder wheel shown in FIGS. 4A and 4B will now be described. As shown in FIG. 5A, a film of the chosen metal is vapor deposited onto the surface of a disk 11 to a thickness of about 300 to 1,000 Å. Then, as shown in FIG. 5B, the disk 11 is exposed to a laser beam 12 while rotating the disk at a predetermined speed. An argon laser may be used. The laser output is focused to a spot with a diameter less than 1 micron by a lens 13. The laser is on/off modulated while the disk 11 is rotated and the laser beam is moved inwardly as the disk 11 is rotated so as to vaporize the metal film in the pattern of grooves depicted in FIG. 4A. Following this, a protective film layer may be deposited over the surface of the disk, if desired.

Figure 6A:
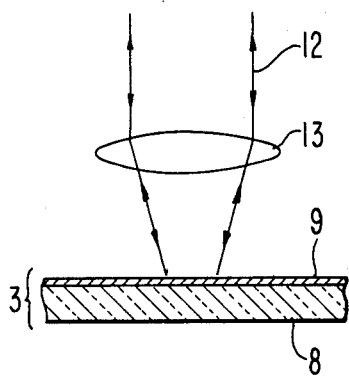
FIGS. 6A through 6C are a set of explanatory diagrams used for explaining the principle of detecting a signal using the encoder wheel of the invention.
Figure 6B:
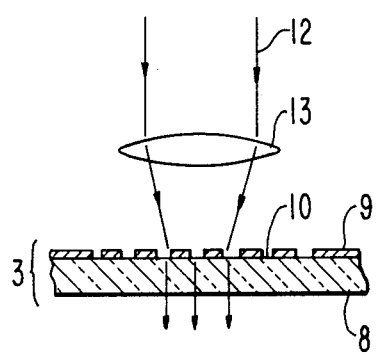

Next, referring to FIGS. 6A through 6B, a method for producing an output signal using the encoder disk formed as described above will now be discussed. A laser beam 12 is shone onto the surface of the encoder wheel 3 through a condenser lens 13. At positions where no grooves are present, all of the incident light is reflected back through the lens 13. On the other hand, where grooves are present, a portion $(P-W)/P$ of the light is reflected and the remainder of the light is transmitted through the grooves. Thus by detecting the reflected light, a signal the same as that in the conventional encoder described above can be obtained.

Figure 7:
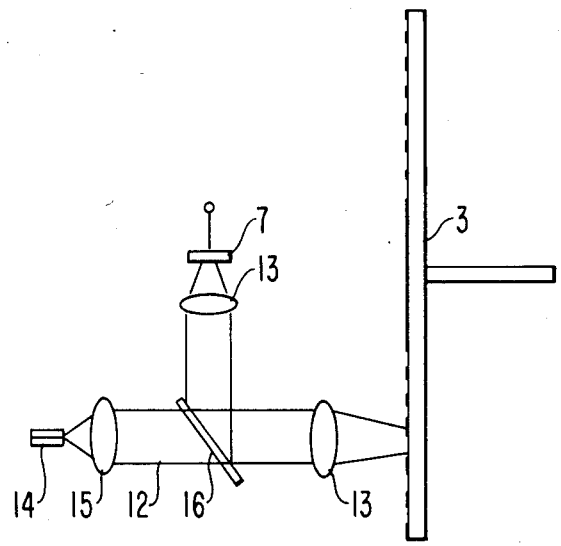
FIGS. 7 and 8 are explanatory diagrams illustrating optical encoders constructed in accordance with the invention.

To detect the reflected light, a system such as that illustrated in FIG. 7 may be used. As shown in FIG. 7, light from a semiconductor laser 14 is focused by a collimating lens 15 and directed onto the surface of the encoder wheel 3 by a condenser lens 13. The reflected light is directed by a semi-transparent mirror 16 through a condenser lens 13 to a light detector 7.

Figure 8:
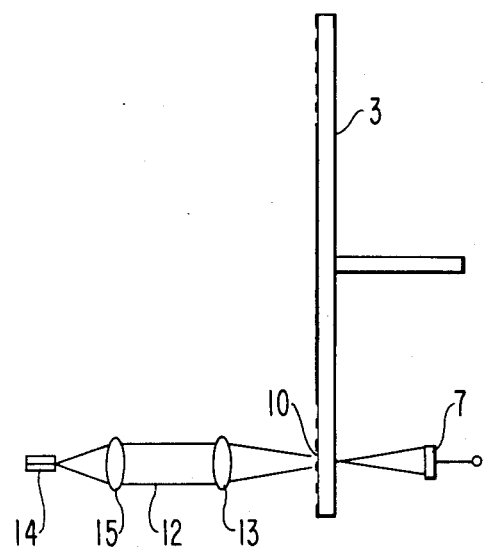
Figure 6C:
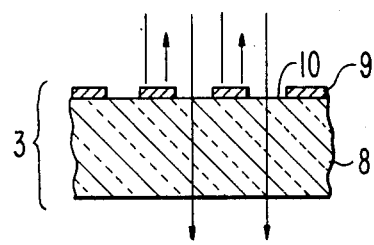

In another embodiment shown in FIG. 8, the light transmitted through the encoder wheel 3 is used to form the output signal. In this embodiment, light from a semiconductor laser 14 is collimated by a collimating lens 13 then directed by a condenser lens 13 to the surface of the optical encoder wheel 3. A detector 7 is positioned on the other side of the encoder wheel 3 to detect the light transmitted through the grooves in the encoder wheel as the encoder wheel is rotated.

Figure 9:
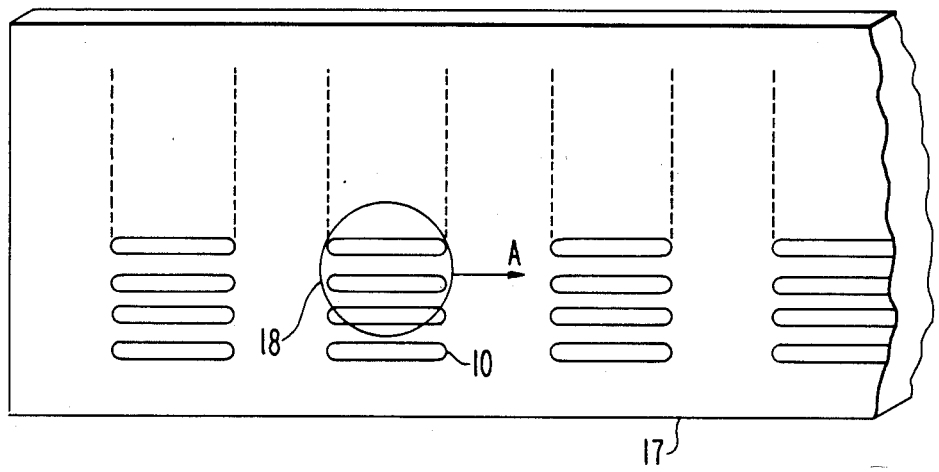
FIG. 9 is a plan view showing a portion of a pulse scale used in the case of detecting an amount of linear movement.

The invention can also be applied to the case of a linear type optical encoder. Such an embodiment will be described with reference to FIG. 9. As shown in FIG. 9, a pulse scale 17, which has the form of a rectangular plate, is provided with a plurality of grooves 10 on its surface. The pulse scale 17 is fixed at one end. An optical system (not shown) is displaced along with the body the displacement of which is to be measured. The optical system includes a semiconductor laser and lenses, similar to the embodiment described immediately above. A circular light spot 18 moves in the indicated direction A as the body is displaced. The amount of displacement can be detected in substantially the same manner as above, that is, by using either the reflected or transmitted light.

Figure 10:
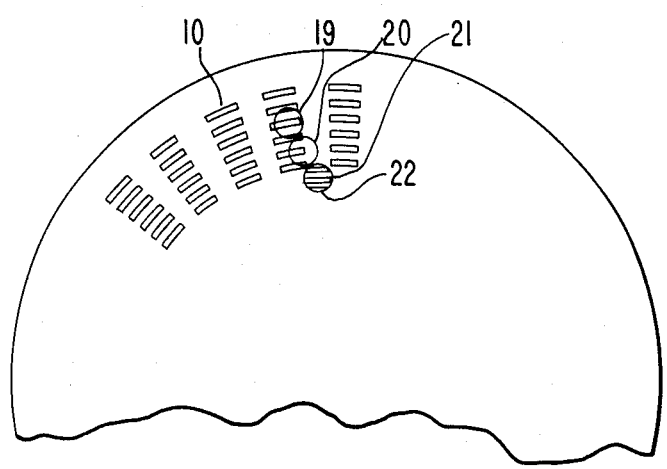
FIG. 10 is a plan view showing a portion of another embodiment of an encoder wheel of the invention.

If it is desired to detect the direction of rotation as well as the amount of rotation, an arrangement such as that depicted in FIG. 10 can be employed. In this embodiment, three laser spots 19, 20 and 21 are directed onto the encoder wheel in the pattern shown to generate phase A and B signals (main signals) and a phase Z signal (zero or reference signal). To generate the phase Z signal, a group 22 of grooves is provided at a reference position on the disk.

Figure 11:
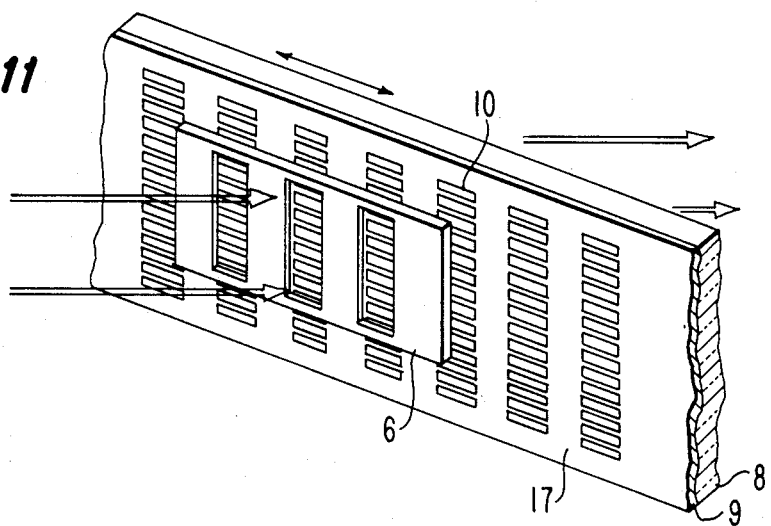
FIG. 11 is a perspective view illustrating the operating mode of an optical encoder of the invention.

FIG. 11 depicts a case where three phase signals are generated using a linear arrangement. In this embodiment, light from a laser, light-emitting diode or incandescent lamp is directed through an index scale to a pulse scale 17 constructed as described above. The light reaching the pulse scale 17 through the index scale is either transmitted or reflected depending upon the presence or absence of grooves. The amount and direction of movement of the pulse scale 17 can be detected from the light signals transmitted therethrough in the same manner discussed above.

In each of the embodiments of an optical encoder described above, the optical encoder wheel or pulse scale is easily fabricated without the need for expensive masking. Accordingly, the optical encoders of the invention can be constructed at a substantially lower cost than for the case of the conventional optical encoder.

This completes the description of the preferred embodiments of the present invention. Although preferred embodiments of the invention have been described, it is believed that numerous modifications and alterations thereto would be apparent to one of ordinary skill in the art without departing from the spirit and scope of the invention.

We claim:

1. An optical encoder, comprising:
   a light source producing light directed along an optical axis;
   a pulse scale having a plurality of light transmitting regions formed therein receiving the light from said light source, each light transmitting region being formed of parallel grooves, the grooves being parallel with a scan direction; and
   a detector for detecting the light reflected from said pulse scale and reflected along the optical axis of said light source.

2. An optical encoder as recited in claim 1, further comprising:
   a first optical system for focusing the light from said light source onto said pulse scale to irradiate one region at a time on said pulse scale; and
   a second optical system for directing the reflected light to said detector.

3. An optical encoder as recited in claim 2, wherein said light source comprises a semiconductor laser.

4. An optical encoder as recited in claim 3, wherein said second optical system comprises:
   a semi-transparent mirror for directing light reflected from said pulse scale to said detector; and
   a condenser lens for focusing light from said semi-transparent mirror onto said detector.

5. An optical encoder as recited in claim 1, further comprising:

an optical system for providing a parallel beam of light for irradiating said pulse scale; and an index scale disposed between said optical system and said pulse scale and closely adjacent said pulse system and said pulse scale and closely adjacent said pulse scale and said detector.

6. An optical encoder as recited in claim 1, wherein the parallel grooves have a pitch P in a range of 1.6 to 2 microns.

7. An optical encoder as recited in claim 6, wherein the parallel grooves have a width in a range of 0.2 P to 0.8 P.

8. An optical encoder, comprising:
a light source producing light directed along an optical axis;
a pulse scale having a plurality of light transmitting regions formed therein receiving the light from said light source, each light transmitting region being formed of parallel grooves, the grooves being parallel with a scan direction; and
a detector for detecting light transmitted through said pulse scale and transmitted along the optical axis of said light source.

9. An optical encoder as recited in claim 8, further comprising:
a first optical system for focusing light from said light source onto said pulse scale to irradiate one region at a time on said pulse scale; and
a second optical system for directing the transmitted light to said detector.

10. An optical encoder as recited in claim 9, wherein said light source comprises a semiconductor laser.

11. An optical encoder as recited in claim 8, further comprising:
an optical system for providing a parallel beam of light for irradiating said pulse scale; and
an index scale located between said optical system and said pulse scale, and closely adjacent said pulse scale and said detector.

12. An optical encoder as recited in claim 8, wherein the parallel grooves have a pitch P in a range of 1.6 to 2 microns.

13. An optical encoder as recited in claim 12, wherein the parallel grooves have a width in the range of 0.2 P to 0.8 P.

* * * * *

UNITED STATES PATENT AND TRADEMARK OFFICE
CERTIFICATE OF CORRECTION

PATENT NO. : 4,757,196

DATED : July 12, 1988

INVENTOR(S) : Koichi Yamada et al.

It is certified that error appears in the above-identified patent and that said Letters Patent is hereby corrected as shown below:

Column 2, line 26, change "a" (second occurrence) to --an--.

Column 3, line 32, change "6B" to --6C--.

Signed and Sealed this

Twenty-second Day of November, 1988

Attest:

DONALD J. QUIGG

*Attesting Officer*   *Commissioner of Patents and Trademarks*